Dec. 17, 1929.  R. E. RILEY  1,739,612
METHOD OF MAKING OVERSHOES
Filed Oct. 8, 1928  5 Sheets-Sheet 1

Inventor:
Ralph E. Riley,
by Spear, Middleton, Donaldson & Hall
Attys.

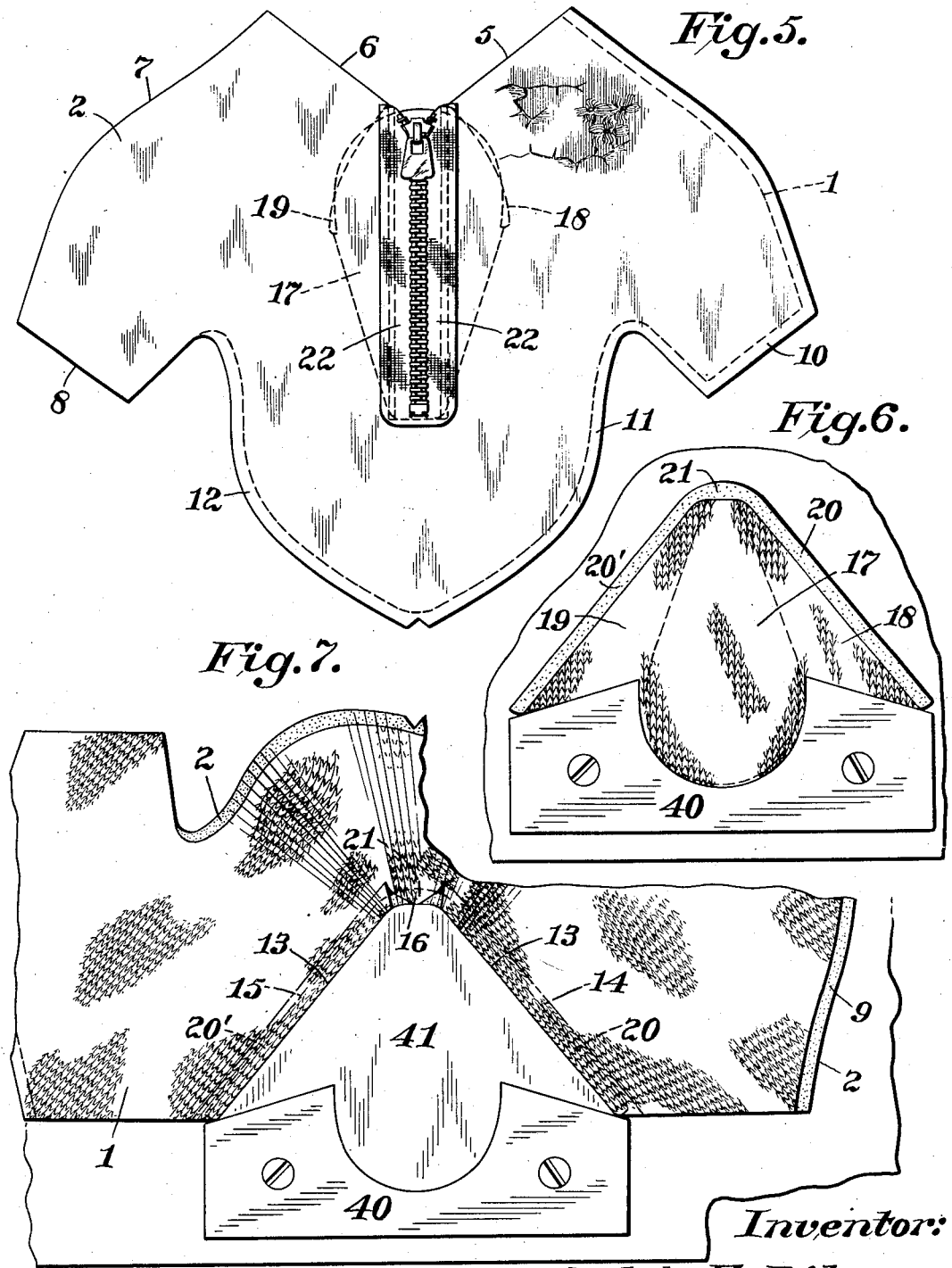

Dec. 17, 1929.  R. E. RILEY  1,739,612
METHOD OF MAKING OVERSHOES
Filed Oct. 8, 1928   5 Sheets-Sheet 3
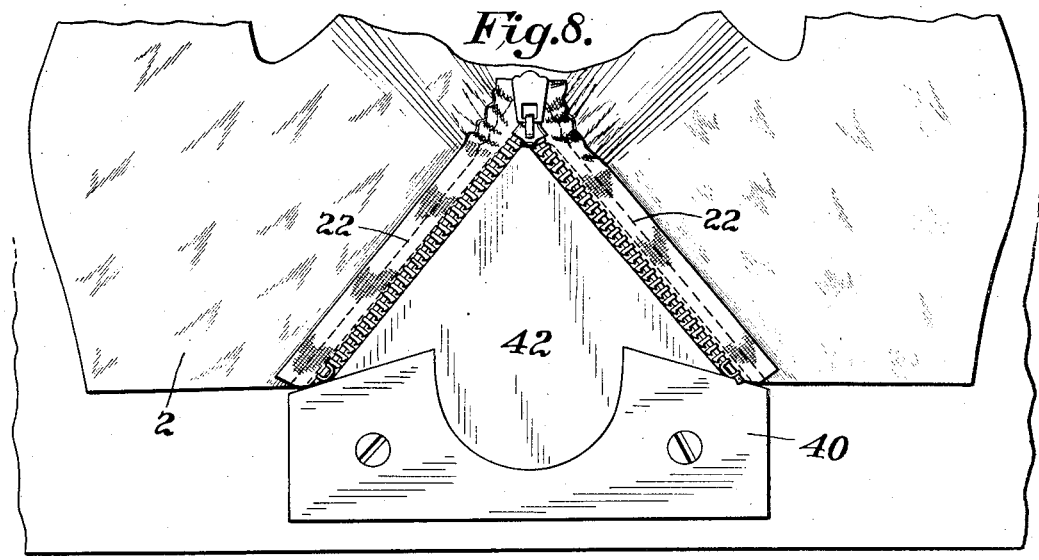
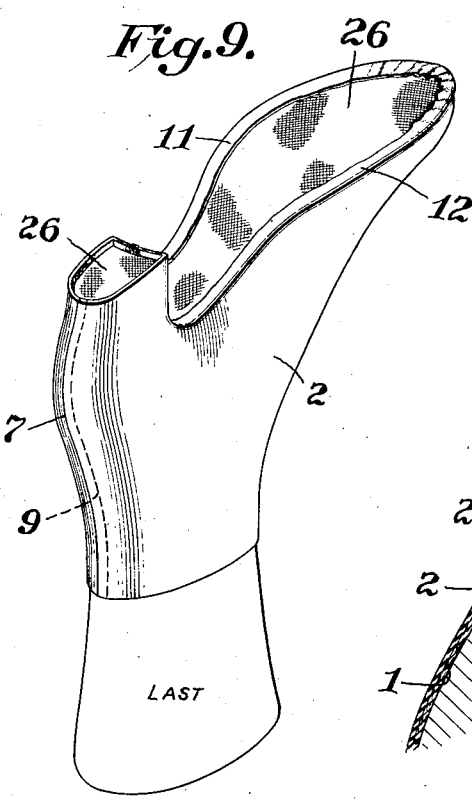
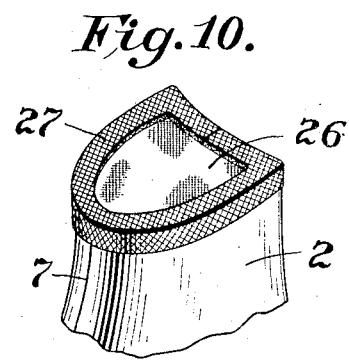
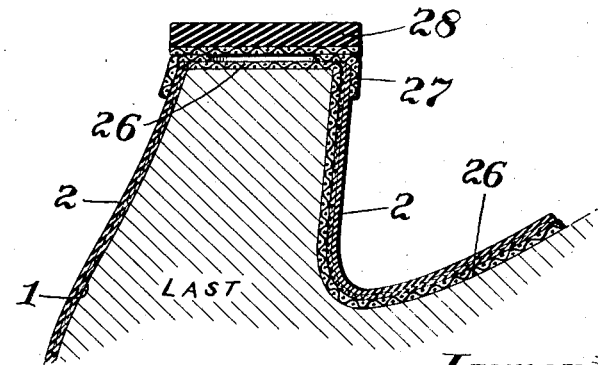
Inventor:
Ralph E. Riley, Dec. 17, 1929.  R. E. RILEY  1,739,612
METHOD OF MAKING OVERSHOES
Filed Oct. 8, 1928   5 Sheets-Sheet 4
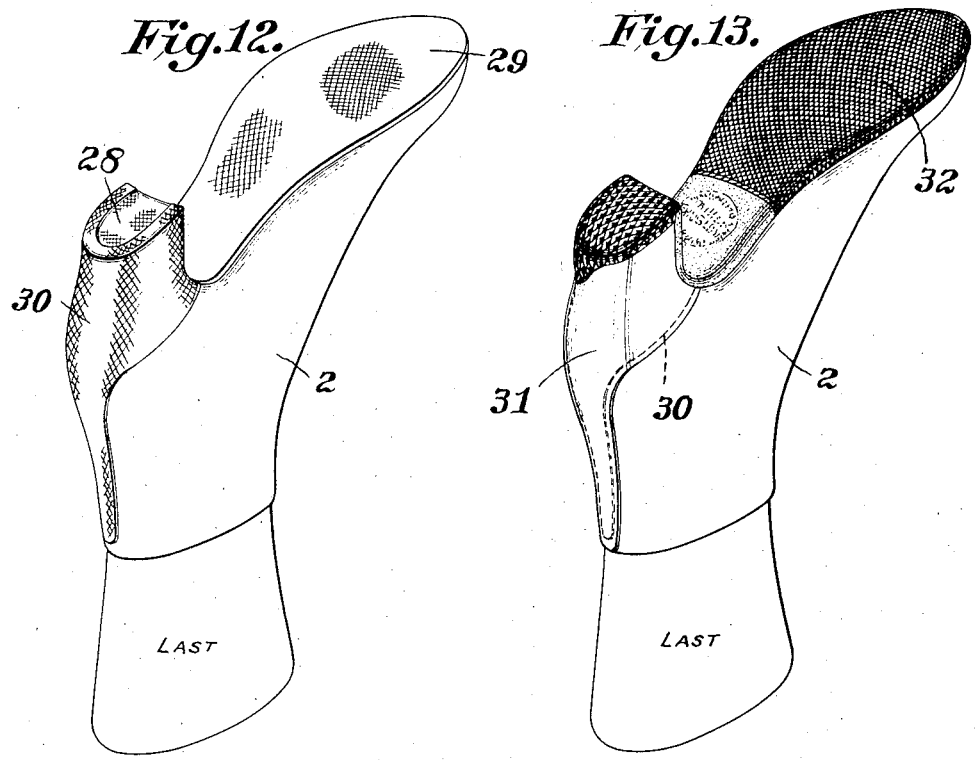
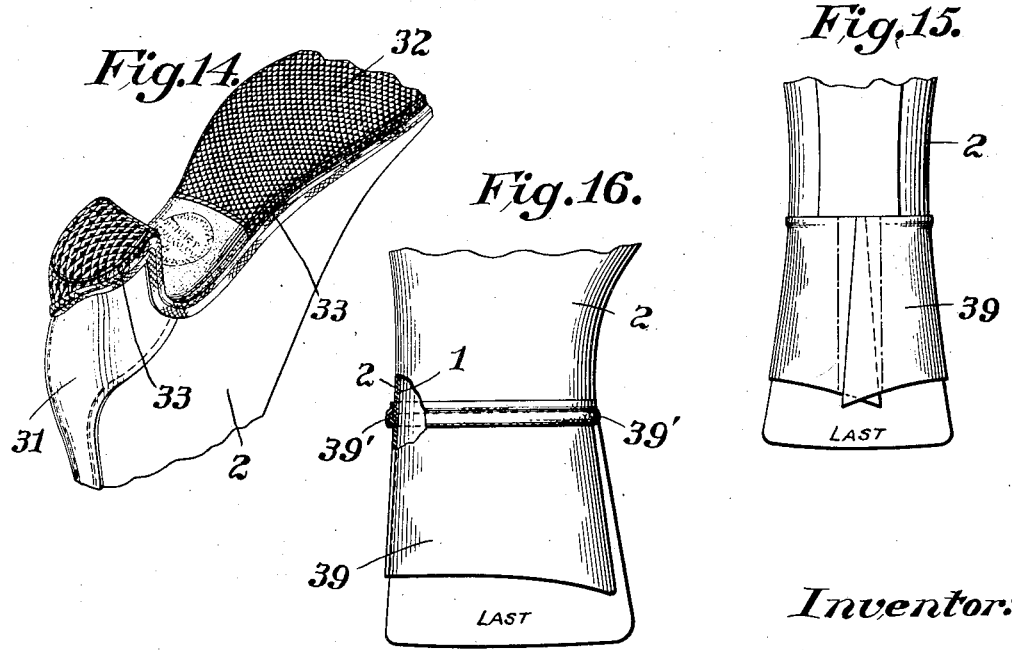
Inventor:
Ralph E. Riley,
by Spear, Middleton, Donaldson & Hall
Attys.

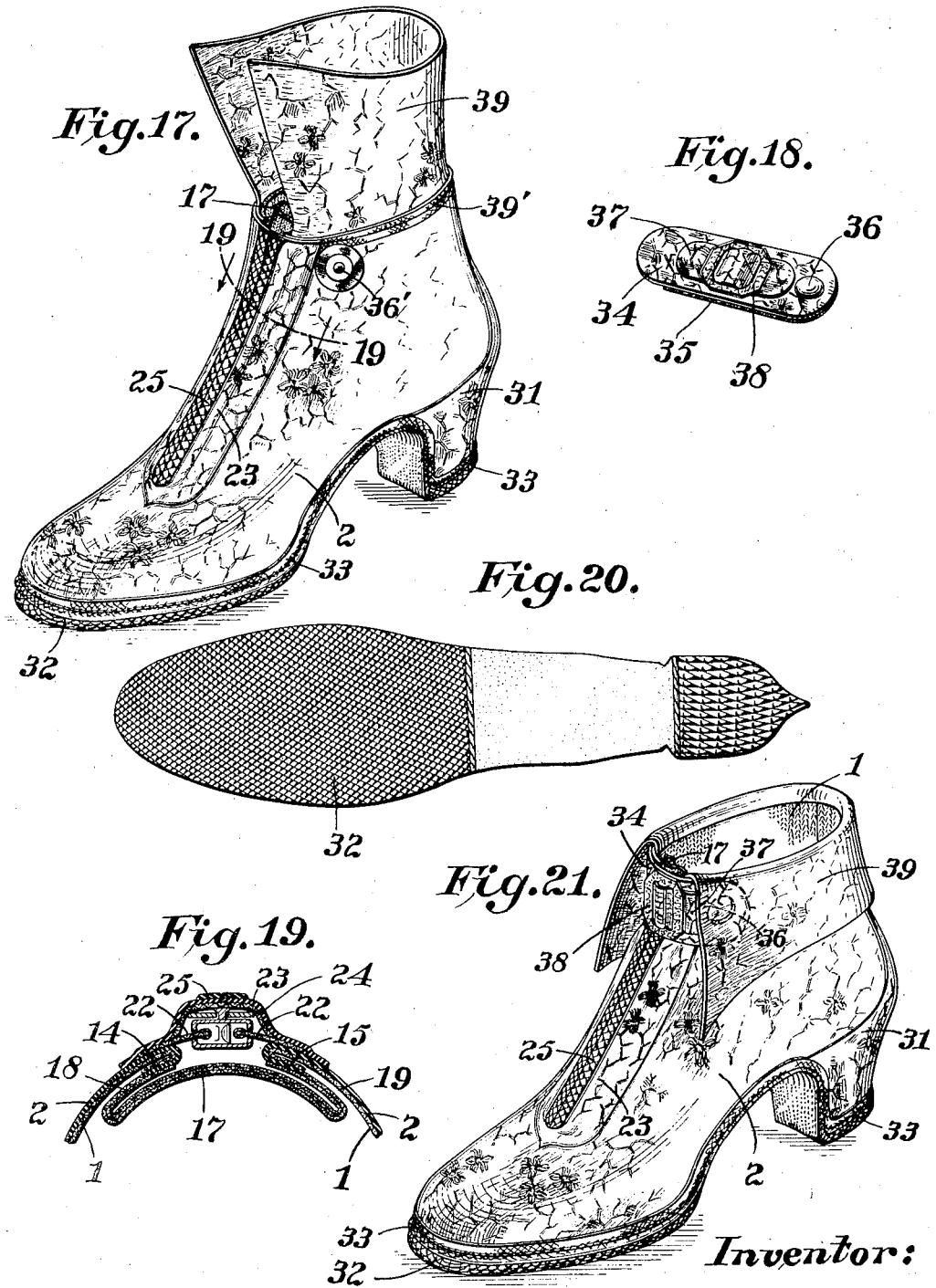

Patented Dec. 17, 1929

1,739,612

UNITED STATES PATENT OFFICE

RALPH E. RILEY, OF AKRON, OHIO, ASSIGNOR TO THE MILLER RUBBER COMPANY, OF AKRON, OHIO, A CORPORATION OF OHIO

METHOD OF MAKING OVERSHOES

Application filed October 8, 1928. Serial No. 311,096.

This invention relates to vulcanized rubber overshoes and to the method of manufacturing the same.

One object of the invention is to provide a light, attractive, fabric lined, snugly fitting, rubber overshoe particularly adapted for wear by women over the ordinary high heel low shoe, and so constructed that it will accommodate itself to a variety of shoes and will extend thereabove and snugly fit about the instep and ankle.

Another object is to provide a method of manufacture involving the use of a minimum amount of material, the reduction of scrap, and particularly non-usable scrap, and the elimination of so-called pressure curing.

Other objects of the invention will appear as the same is hereinafter specifically described.

A preferred construction of shoe and method of manufacturing it embodying the invention is illustrated in the accompanying drawings, in which:

Fig. 5 is a plan view illustrating the closure device attached to the upper unit.

Figs. 6 to 8 are plan views showing the procedure in the production of the upper unit, tongue and fastener assembly.

Fig. 9 is a perspective view illustrating the application of the upper and inner sole of the shoe to the last.

Fig. 10 is a detailed perspective view showing the heel binding strip.

Fig. 11 is a transverse sectional view illustrating the heel construction.

Figs. 12, 13 and 14 are perspective views illustrating further developments in the manufacturing procedure.

Figs. 15 and 16 are detailed views showing the cuff in association with the upper edge of the upper.

Fig. 17 is a perspective view of the shoe showing the fly strip when initially applied.

Fig. 18 is a detailed view of the buckle strap.

Fig. 19 is a transverse sectional view of the completed shoe taken about on the line 19—19, Fig. 17.

Fig. 20 is a view of the outer sole, and

Fig. 21 is a perspective view of the completed shoe, closed, and with the cuff turned down.

Figure 1:
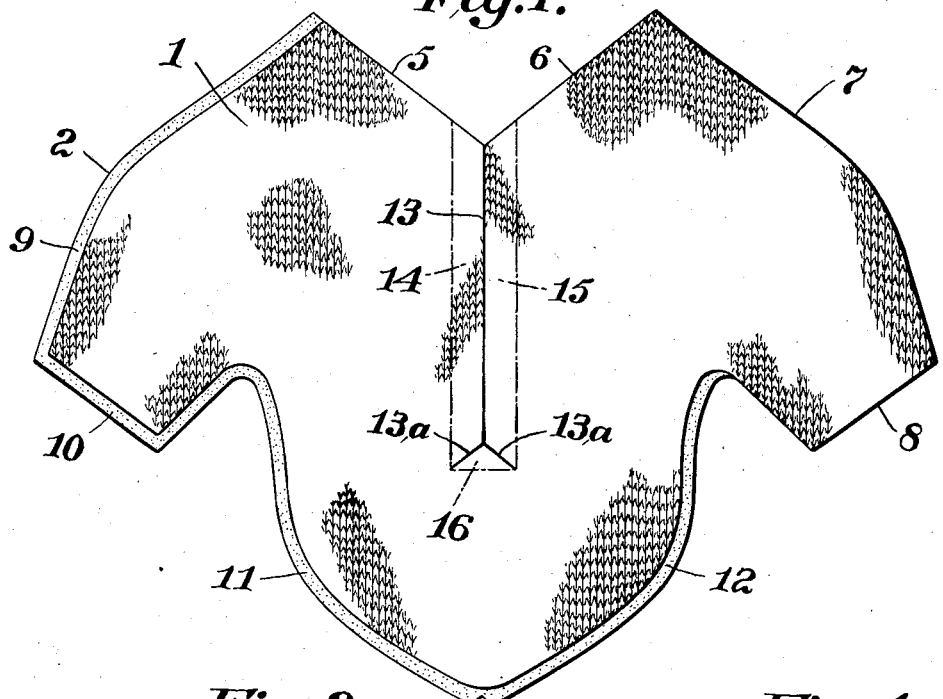
Figure 1 is a plan view of the unit forming the shoe upper.
Figure 2:
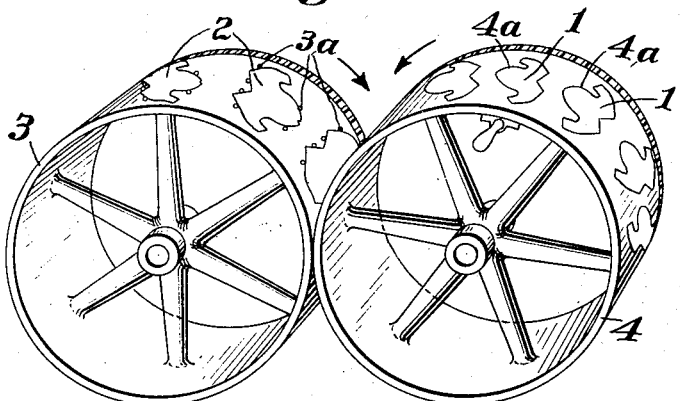
Fig. 2 is a perspective view of means for registering and initially uniting the fabric lining sheet and the thin rubber sheet to form the upper unit.

As illustrated in the accompanying drawings, the top, vamp, quarters, and portions of the heel of the shoe are formed from a single highly flexible, light, elastic unit, made by vulcanizing together an elastic, attractive, fabric, lining sheet 1, and a thin rubber sheet 2, preferably embossed to give its exterior an ornamental appearance. The rubber sheet is preferably made from a so called low temperature curing rubber compound; that is, a compound containing an ultra, or fast curing accelerator, so that vulcanization can be effected in a relatively very short time. The inner surface of the lining sheet, or that surface which is brought into contact with the rubber sheet 2, has calendered upon it a skim coating of an ordinary rubber compound; that is, a compound not including an ultra, or fast curing accelerator.

In the production of the upper unit, the two sheets 1 and 2 are cut from sheet material and placed at separated points upon the periphery of companion drums 3 and 4, which are in close juxtaposition to each other and which turn in unison, one in a clockwise direction, and the other in an anti-clockwise direction. The drum 4 is provided peripherally with spaced apart fabric areas 4ª upon which the fabric lining sheets 1 are located, and the periphery of the drum 3 is provided with correspondingly spaced areas defined by retractal pins 3ª, between which the sheets 2 are placed and retained. As the drums rotate, companion sheets 1 and 2 are pressed into adhering contact with each other.

The sheets 1 and 2 substantially correspond in contour, but the sheet 1 is made somewhat smaller, so that when corresponding edges 5, 6, 7 and 8 of the sheets are registered, narrow marginal attaching surfaces 9, 10, 11 and 12 will be exposed on the sheet 2.

As stated, the compound which is used for the rubber sheet material is of the fast curing type. Were this compound used for the skim coating of sheet 2, the scrap could not be re-used to material advantage, because a set-up or incipient vulcanization of this coating material would occur in a relatively brief time. However, after the lining sheet is initially attached to the rubber sheet as described, sufficient migration will take place of the vulcanizing ingredients into the skim coat of the fabric to provide for the vulcanization thereof practically as rapidly as the rubber sheet, and in the same vulcanizing operation to which the latter is subjected.

This use of a slow curing compound, as the skim coat for the lining sheet, permits the scrap formed by cutting the blanks from a larger sheet to be ground up and used for any work in which a fibrous rubber compound may be employed.

After the upper blank or unit has been formed in the manner described, it is slit centrally as indicated at 13, Fig. 1. This slit opens out through the top of the blank and terminates at its lower end in a fork, or transversely extending branches 13ª. As will be later described, marginal portions parallel to the slit 13, are turned back upon the face of the lining to provide the vent opening and marginal attaching flaps 14, 15. When the branches form a fork, a short attaching flap 16 is provided at the closed end of the vent opening.

Figure 4:
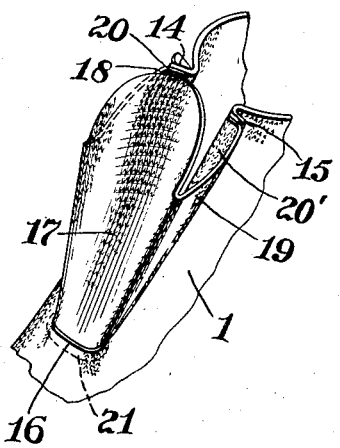
Fig. 4 is a perspective view of the upper and tongue assembly.
Figure 3:
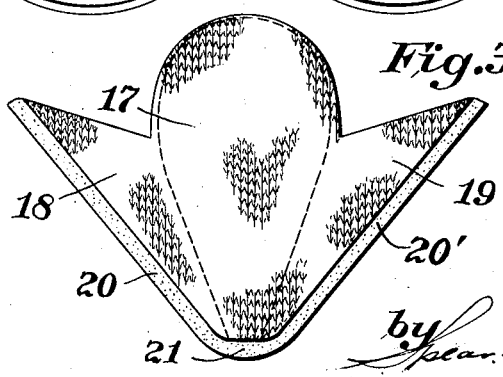
Fig. 3 is a plan view of the tongue before it has been formed into bellows shape.

The shoe illustrated is provided with a bellows tongue shown in detail in Figs. 3 and 4. As illustrated, this tongue includes a substantially wedge-shaped intermediate section 17 transversely concavo-convexed and at its upper portion curving outwardly slightly, from its upper end in the direction of its length, and two side wings 18 and 19. The tongue is formed of two arrow head shaped fabric sheets preferably corresponding to the lining fabric described, superimposed upon each other with their coated faces in contact and an intermediate wedge-shaped piece of frictional fabric substantially corresponding in contour to the intermediate section 17.

One of the two sheets forming the tongue is made slightly smaller than the other, so that when superimposed upon the larger sheet, marginal attaching surfaces 20, 20' and 21 will be exposed on the rubber-coated face of the latter.

In securing the tongue in position, the marginal attaching edges 20, 20' are rolled into firm contact with the outer faces of the parts of the upper unit which form the flaps 14, 15, and the attaching surface 21 rolled in contact with the small flap 16, which in this operation is preferably stretched transversely so that it will be more nearly corresponding in area to that of the attaching surface 21, or with the outer portion of the sheet 2 adjacent the closed end of the vent opening.

The vent opening in the upper, formed by slitting the same and turning back the flaps 14, 15, preferably has associated therewith a fastener device of known type, comprising parallel companion tapes or woven fabric strips, known as stringers, each carrying a plurality of metallic interlocking members, a slide for engaging and disengaging these members, and a pull element for facilitating the shifting of the slide.

This fastening device is preferably attached to the upper before it is placed on the last.

In this step, the attaching faces of the stringers, or tapes 22, having had rubber cement applied thereto and dried to a tacky condition, the upper unit is placed on a table with its lining face down, and then the stringers are rolled into adhering contact with the outer surface of the sheet 2 back of but contiguous to the edges of the vent opening.

For attaching the tongue and fastener to the upper, a procedure as follows may be practiced:

The upper edge of the tongue illustrated in Fig. 3 is abutted against a complemental edge of a template 40 secured to a table top upon which the tongue is placed with the sheet of smaller area upwardly presented. There is then superimposed upon the tongue a template 41 substantially corresponding in contour to the sheet of the tongue of smaller area so that there will be exposed beyond the edge of the template 41 the marginal attaching surfaces 20, 20', and 21 of the tongue. The upper unit with its fabric face presented upwardly is then placed on the table with the edges of the slit 13 contacting with the side edges of the template 41, which will bring the portions of the upper which are to form the flaps 14, 15 into registration with the exposed marginal attaching surfaces of the tongue aforesaid. These parts are then rolled into firm adhering contact.

The template 41 is then removed and the upper reversed so that its fabric face is presented against the table top, but otherwise occupying the same position it did in the tongue attaching operation. A template 42 is then placed in the position previously occupied by the template 41 with its under surface resting upon the tongue and with the vent opening stretched to the maximum extent. A slide fastener open to the maximum extent is then straddled over the apex of the template as shown in Fig. 8, and with the ends of the metal interlocking members of the fastener contacting with the edges of the template. With the parts in this position, the stringers are rolled in adhering contact with the outer portion of the upper parallel with and contiguous to the fold lines of the flaps 14, 15. It will be understood, of course, that in this procedure up to this point the flaps 14, 15 have not been folded over.

As will be understood, the described procedure provides a satisfactory way of obtaining accurate adhering contact of the bellows tongue to the upper, and it further provides means for accurately locating the slide fastener so there will be an adequate and uniform space between the rear ends of the metallic interlocking members and the adjacent edges of the fold line, in which the slide member may travel in the completed shoe.

In order to protect the closure device during the vulcanization operation and for substantially concealing this device when the shoe is worm with the fastener closed, a suitable fly 23 is provided, consisting of a strip of sheet rubber somewhat longer and wider than the fastener device and a strip of lining fabric 24 of substantially the width and length of the metallic inter-engaging members which is secured lengthwise along the middle of the sheet rubber strip.

The inner surface of the rubber strip parallel to the longer edges of the lining thereof is pressed in firm adhering contact with the stringers back of the metallic interlocking members and the adjacent surface of the outer face of sheet 2, and with a portion thereof adjacent the closed end of the vent. Fly strip 23 is provided centrally with a finishing band 25, preferably scored, or indented, lengthwise for guiding the knife of the operator in the slitting of the same and the fly strip after vulcanization has been completed.

The upper with the parts attached as shown in Fig. 5, or with the addition of the fly strip and finishing strip, is then placed about a metal last and the exposed marginal edge 9 overlapped upon and rolled into firm adhering contact with the outer face of the sheet 2, substantially parallel to the edge 7. An insole 26, having been applied to the last, which extends along the heel breast and over the end face of the heel, the edges of the upper are pulled over so as to overlap the sole portion of the insole, and with other portions overlapping each other upon the breast of the heel and rolled into firm adhering connection with the contacting surfaces.

The upper is now trimmed flush around the heel and then a narrow binding 27 of rubberized fabric is applied, as shown in Fig. 10. A heel lift 28, composed of an outer block of thick rubber and an inner sheet of friction fabric, is now applied. A half sole 29 of friction fabric is then applied over the insole and overlapped upon portions of the upper, extending around the heel breast. A back reinforcement 30, of substantially T-shape, cut from a sheet of friction fabric, is applied around the side face of the heel and extended up the back of the shoe for covering the rear seam described, and a back trim 31 of substantially the same shape, but made of sheet rubber, is applied over the fabric strip 30 and rolled down thereupon and upon the contiguous face of the sheet 2. An outsole 32 is now applied, which extends up the breast of the heel and over the face of the same and overlaps the back trim 31 contiguous to the edge of the heel. Finally, a foxing 33 is applied for giving the sole and heel of the shoe a finished appearance.

The shoe may be equipped with a strap at its top for giving a more finished appearance thereto and for concealing the operating slide and pull member of the fastening device, and this strap may, if desired, be provided with a suitable ornament, as a mock buckle member, as illustrated in the drawings, particularly Fig. 18. This strap consists of a strip of rubber 34 of preferably the same material as the sheet 2 aforesaid, partly lined with fabric strip 35 such as that forming the sheet 1. The unlined part of strip 34 is initially pressed into firm contact with upper and is ultimately vulcanized thereto. The opposite end of this strip is equipped with a female member 36 of a snap fastener which cooperates with the male member 36' carried by the upper. A smaller strip of rubber 37 is attached to the outer face of the strip 34 and carries the ornament 38 aforesaid. In assembling the parts for vulcanization, the strip 35 is rolled down against the face of the sheet 2 and will hold the strap in position during vulcanization, or this strip may be held back during vulcanization so that when the shoe is provided with a cuff, as will be hereinafter described, when the snap fastener is detached, the strap will normally fold back under the cuff, if that is turned down. This may be desirable because the shoe may be worn with the upper part of the vent openings spread apart and the upper part of the tongue exposed.

A wide cuff 39 is preferably associated with the top edge of the upper, being designed to serve as an upward extension thereof and protection for the stocking, when such protection is necessary, and to be turned down at other times. This cuff is made of rubber sheeting corresponding to the sheet 2, and is unlined, so that both sides thereof may be washed.

The cuff is made from a wide band of rubber sheeting which is overlapped at its lower edge upon the outer face of the edge of sheet 2, and the vertical edges of the band are overlapped one upon the other upon the leg portion of the last and the parts rolled down. A suitable foxing 39' is applied over the juncture of the lower edge of the band and the upper edge of the upper.

The shoe having been assembled as described, it is then vulcanized and this may be expeditiously done by hanging the last on a conveyor which passes through a hot oven where the shoe is en route subjected to the desired vulcanizing temperature for the requisite time.

After the shoe has been vulcanized, the lining 35 of the strap heretofore described is peeled loose from the part of the upper to which it has been lightly stuck, as before stated.

By means of a knife, the strip 25 and fly are split along the crease in the finishing strip.

The overlapping portion described of the cuff is also cut out and the slide fastener member of the device is manipulated for disengaging the interlocking members of the fastener so that the vent may be opened and the shoe removed from the last. The snap fastener members are then applied to the buckle strap and to the upper of the shoe.

Since practically all of the parts are initially secured together without employing cement and are ultimately vulcanized to one another, it is unnecessary, to prevent blowing or air pockets during vulcanization, to subject the shoe to differential pressure, or a so-called pressure cure.

I claim as my invention:

1. The method of manufacturing a light, lined, waterproof overshoe, consisting in forming an upper unit to provide the shoe vamp, top, quarters, and portions of the heel by blanking out a correspondingly shaped member from an elastic fabric sheet, and a thin rubber sheet, superimposing the sheets upon each other and pressing them in adhering contact, said fabric sheet being made somewhat smaller in size than the rubber sheet to leave portions of the latter exposed to form marginal attaching portions, slitting the upper so formed centrally from its upper edge toward the vamp forming portion thereof, forming a bellows tongue including a central wedge-shaped part and side wings by superimposing one upon the other two pieces of skim coated fabric of substantially the same shape but one of somewhat less area than the other to leave marginal attaching surfaces, pressing the marginal surfaces at the sides of the tongue in firm contact with the unlined face of marginal portions of the upper contiguous to said slit, and the marginal surface of the apex of the wedge with the upper unit adjacent the closed end of the slit, cementing the stringers of a slide fastener to the upper along lines which will form fold-lines of said marginal portions of the upper, pressing in adhering contact with the stringers and the portions of the upper adjacent thereto a fly strip, said strip consisting of a sheet of rubber somewhat longer and wider than the fastening device and a strip of fabric secured thereto of somewhat less length and width than the same, applying to a last an inner sole member conforming in shape to the entire bottom of the last including the heel portion of the same, shaping the upper upon the last and overlapping a marginal attaching portion thereof upon a complementary edge portion of the upper along the back of the last, attaching another marginal edge portion of the upper to the side edges of the inner sole, and overlapping a portion of the upper upon the heel breast portion of the inner sole, applying a binding strip around the edge of the heel, applying a heel lift, including a piece of thick rubber, applying a fabric half sole over the insole aforesaid, applying a T-shaped fabric reinforcement over the side surface of the heel and over the rear seam of the upper, applying over the reinforcement a back trim of approximately the same shape thereas, applying an outer sole, said outsole extending over the heel breast and face of the heel and overlapping upon side portions of the heel, rolling the same into intimate engagement with the parts with which it makes contact, applying a foxing around the edge of the outer sole, pressing the lower edge of a wide sheet rubber strip into adhering contact with the upper edge of the upper and overlapping the end edges of the strip one upon the other and pressing them in adhering contact on the last, then subjecting the shoe formed upon the last aforesaid to a vulcanizing operation and after the vulcanization is completel, slitting the fly strip for exposing the fastening device, cutting out the section of the band formed by the overlapping end edge portions, and manipulating the slide of said device for opening the vent for the removal of the shoe from the last.

2. The method of manufacturing a light, lined, waterproof overshoe, consisting in forming an upper unit to provide the shoe vamp, top, quarters, and portions of the heel by blanking out a correspondingly shaped member from an elastic fabric sheet, and a thin rubber sheet, superimposing the sheets upon each other and pressing them in adhering contact, said fabric sheet being made somewhat smaller in size than the rubber sheet to leave portions of the latter exposed to form marginal attaching portions, slitting the upper so formed centrally from its upper edge toward the vamp forming portion thereof, forming a bellows tongue including a central wedge-shaped part and side wings by superimposing one upon the other two pieces of skim coating fabric of substantially the same shape but one of somewhat less area than the other to leave marginal attaching surfaces, pressing the marginal surfaces at the sides of the tongue in firm contact with the unlined face of marginal portions of the upper contiguous to said slit, and the marginal surface of the apex of the wedge with the upper unit adjacent the closed end of the slit, cementing the stringers of a slide fastener to the upper along lines which will form fold-lines of said marginal portions of the upper, pressing in adhering contact with the stringers and the portions of the upper adjacent thereto a fly strip, said strip consisting of a sheet of rubber somewhat longer and wider than the fastening device and a strip of fabric secured thereto of somewhat less length and width than the same, applying to a last an inner sole member conforming in shape to the entire bottom of the last including the heel portion of the same, shaping the upper upon the last and overlapping a marginal attaching portion thereof upon a complementary edge portion of the upper along the back of the last, attaching another marginal edge portion of the upper to the side edges of the inner sole and overlapping portion of the upper upon the heel breast portion of the inner sole, applying a binding strip around the edge of the heel, applying a heel lift, including a piece of thick rubber, applying a fabric half sole over the insole aforesaid, applying a T-shaped fabric reinforcement over the side surface of the heel and over the rear seam of the upper, applying over the reinforcement a back trim of approximately the same shape thereas, applying an outer sole, said outsole extending over the heel breast and face of the heel and overlapping upon side portions of the heel, rolling the same into intimate engagement with the parts with which it makes contact, applying a foxing around the edge of the outer sole, then subjecting the shoe formed upon the last aforesaid to a vulcanizing operation and after the vulcanization is completed, slitting the fly strip for exposing the fastening device, and manipulating the slide of said device for opening the vent for the removal of the shoe from the last.

3. A method of producing an upper unit, bellows tongue and slide fastener assembly, comprising bringing into adhering contact a skim coated face of an elastic fabric sheet with the face of a thin rubber sheet, said sheets being shaped to form the vamp, quarters, top and portions of the heel, slitting the unit from its upper edge towards the part thereof which is to form the vamp of the shoe, forming a substantially arrow-head-shape tongue blank by bringing into adhering contact the coated surfaces of two skim coated fabric sheets, one of said sheets being smaller than the other to provide exposed rubber marginal surfaces on the larger sheet, placing the tongue on a table with the fabric sheet presented upwardly and the top edge of the tongue in contact with the complemental edge of a template secured to the table, placing a template on top of the tongue which conforms in contour to the fabric sheet, whereby the attaching surface of the tongue aforesaid is exposed beyond the sides of the second template, spreading the opening formed in the upper by the slit to bring the edges thereof into contact with the side edges of the last named template and with the unlined side face of the upper unit presented downwardly towards the table, rolling the marginal surfaces of the upper adjacent the edge of the opening therein into firm adhering contact with the exposed edges of the tongue, removing the second template, reversing the position of the upper for presenting the fabric face thereof towards the table top, placing a third template in substantially the position occupied by the second template, the side walls of the third template being arranged substantially parallel to but spaced from the edges of the slit aforesaid when spread to the maximum extent permitted by the tongue which has been attached to the upper, straddling the stringers with attached metal interlocking members over the third template with the ends of such members in contact with the side edges of the third template and rolling the marginal portion parallel to the outer edge of the stringers into adhering contact with the underlying portions of the unlined faces of the upper, substantially as described.

4. The method of manufacturing a fabric-lined light rubber overshoe equipped with a slide fastener type of closing device for the vent opening of the shoe, and a wide reversible cuff at the top of the shoe consisting in forming an upper unit by attaching to a thin sheet of rubber of appropriate shape a substantially corresponding shaped sheet of elastic fabric, forming a slit in the upper unit to provide a vent opening, attaching a tongue at one lengthwise marginal edge to an unlined marginal portion adjacent the slit, securing in adhering contact along each edge of the opening, but spaced therefrom, stringers of a closing device of the slide type, securing in adhering contact to the outer faces of the stringers and adjacent surfaces of the upper a fly strip, shaping the upper upon a last, overlapping and securing in adhering contact complemental edges of the upper along the back of the last, connecting the upper to sole and heel members, securing the lower edge of a wide rubber cuff to the upper edge of the upper, overlapping the front edges of the cuff upon each other and rolling them in adhering contact, vulcanizing the article, slitting the fly strip lengthwise, cutting out the section of the cuff provided by the overlapping front edges of the cuff, opening the fastener and removing the shoe from the last.

5. The method of manufacturing a light, lined, waterproof, vulcanized shoe including providing a unit for forming the vamp, upper, and heel portions of the shoe, said unit consisting of a thin rubber sheet and a counterpart elastic fabric lining sheet in adhering face to face contact therewith, providing a vent opening in the unit, applying closure means to the marginal walls of the vent opening, placing said unit about a last with the closure means in closed position, and effecting adhering contact between complemental edge portions of the rubber sheet along the back of the last, securing to the last above the unit a band of sheet rubber, effecting adhering contact between the front edge portions of the band along the front of the last and adhering contact between the lower edge of the band and the contiguous marginal edge portion of the upper, vulcanizing the shoe, severing the band substantially in line with the vent opening in the shoe, separating the sides of the vent opening and removing the shoe from the last.

6. In the manufacture of a vulcanizable shoe, the step of applying the shoe parts to a last, applying a wide band of rubber, for forming a reversible cuff on the completed article, snugly about the last above the top of the shoe, effecting adhering contact between the front edges of the band at the front of the last and adhering contact between the bottom marginal edge portion of the band and the contiguous edge portion of the shoe, then vulcanizing the article and after the vulcanization is completed, severing the band substantially in alinement with the vent opening in the shoe.

7. The method of manufacturing a light, lined, waterproof, vulcanized overshoe including providing in substantially flat form a unit for forming the toe portion, vamp, upper, and heel portions of the shoe, said unit being formed of a thin sheet of rubber and a counterpart elastic fabric lining sheet in adhering face to face contact, slitting the unit to provide a vent opening, effecting adhering contact between a marginal edge portion of a tongue strip and a marginal edge portion of the rubber sheet contiguous one edge of said vent opening, forming adhering contact between the stringers of a slide fastener and the marginal edge portions of said rubber sheet contiguous the vent opening, effecting adhering contact between marginal edge portions of a covering strip and said rubber sheet parallel and contiguous to the outside edges of said stringers, then placing the unit about a last while the fastener is in closed position, and effecting adhering contact between complemental edges of the same along the back of the last, then applying the remaining parts to form the complete shoe, then vulcanizing the shoe, then slitting the covering strip and disengaging the engaging members of the slide fastener for opening the vent, then removing the completed shoe from the last.

8. The method of manufacturing a light, lined, waterproof, vulcanized overshoe including providing in substantially flat form a unit for forming the toe portion, vamp, upper, and heel portions of the shoe, said unit being formed of a thin sheet of rubber and a counterpart elastic fabric lining sheet in adhering face to face contact, slitting the unit to provide a vent opening, effecting adhering contact between a marginal edge portion of a tongue strip and a marginal edge portion of the rubber sheet contiguous one edge of said vent opening, forming adhering contact between the stringers of a slide fastener and the marginal edge portions of said rubber sheet contiguous the vent opening, while the fastener is in closed position, effecting adhering contact between marginal edge portions of a covering strip and said rubber sheet parallel and contiguous to the outside edges of said stringers, then placing the unit about a last and effecting adhering contact between complemental edges of the same along the back of the last, effecting adhering contact between the sole and heel portions of the shoe and marginal portions of the rubber sheet of said unit, effecting adhering contact between the upper of the shoe and a wide band designed to provide a reversible cuff on the completed shoe, said band closely fitting the last and having its front edge portions in adhering contact with each other, then vulcanizing the shoe, then cutting the band in line with the vent opening in the shoe, slitting the covering strip and disengaging the engaging members of the slide fastener, spreading the vent, and then removing the vulcanized shoe from the last.

9. In the manufacture of a shoe equipped with a vulcanized reversible cuff at the top of the upper adapted to be turned up to closely embrace the leg and to be turned down about the top portion of the upper, the steps of snugly applying to the portion of the last above the upper a wide sheet of unvulcanized rubber, connecting the end edges of the sheet at the front of the last for forming an endless band, and effecting adhering contact between the marginal lower edge portion of the band and the contiguous part of the shoe, then vulcanizing the article, and then severing the band at the front of the last.

10. In the manufacture of a shoe equipped with a vulcanized sheet-rubber reversible cuff, adapted when turned up to closely embrace the leg, the steps of snugly placing on the last above the top of the shoe a wide band of uncured rubber, effecting adhering contact between the front edge portions of the band at the front of the last by overlapping one of said edge portions upon the other, effecting adhering contact between the bottom marginal edge portion of the band and the contiguous part of the shoe upper, then vulcanizing the article, and thereafter severing the band by cutting out therefrom the overlapped portion of the same at the front of the last.

11. In the manufacture of a shoe substantially of the character described, the formation of a substantially flat assembly adapted to be applied to the last of the shoe, involving steps as follows: providing in substantially flat form a unit for forming the toe portion, vamp, upper, and heel portions of the shoe, the unit consisting of a thin sheet of rubber and a counterpart elastic fabric lining sheet in adhering face to face contact, providing a vent opening substantially at the middle of the upper portion of the unit so formed, effecting adhering contact between a marginal edge portion of a tongue strip and a marginal edge portion of the rubber sheet contiguous an edge of said vent opening, forming adhering contact between the stringers of a slide fastener and the marginal edge portions of said rubber sheet contiguous the vent opening therein, and effecting adhering contact between marginal edge portions of a covering strip and said rubber sheet, parallel and contiguous to the outside edges of the stringers.

12. The procedure specified in claim 11, followed by the application of the assembly to a last with the fastening elements in closed position, effecting at the back of the last adhering contact between complemental edge portions of the rubber sheet of said unit, applying a back piece having a part overlapping the last named edge portions, and portions extending about the heel of the shoe, applying sole, heel, and trimming parts, then subjecting the article to a vulcanizing action, thereafter slitting the covering strip and spreading the sides of the vent opening, and then removing the vulcanized shoe from the last.

13. The procedure of claim 11, following by the application of the assembly to a last with the fastener element in closed position, effecting adhering contact at the back of the last between complemental edge portions of the rubber sheet of said unit, applying the sole, heel, and trimming members, snugly placing about the last above the upper a band of uncured rubber, effecting adhering contact at the front of the last between the front edges of the band and between the lower marginal edge portion of the latter and the contiguous marginal edge portion of the upper, then vulcanizing the article, thereafter slitting the band and the covering strip and spreading the sides of the vent opening, and finally removing the shoe from the last.

14. In the manufacture of a vulcanizable shoe, the steps of applying the shoe parts to a last, applying a wide band of rubber, for forming a reversible cuff on the completed article, snugly about the last above the top of the shoe, effecting adhering contact of the end edges of the band and adhering contact between the bottom edge portion of the band and the contiguous edge portion of the shoe, then vulcanizing the article, and after the vulcanization is completed, severing the band substantially in alinement with the vent opening in the shoe.

In testimony whereof, I affix my signature.
RALPH E. RILEY.